April 28, 1964  S. ROTHBERG  3,130,709

SPHERICAL RESTRAINING DEVICE FOR SMALL ANIMALS

Filed Oct. 29, 1962

INVENTOR
Sidney Rothberg

BY George Renehan

ATTORNEY 3,130,709
SPHERICAL RESTRAINING DEVICE FOR
SMALL ANIMALS
Sidney Rothberg, 5508 Elderon Ave., Baltimore 15, Md.
Filed Oct. 29, 1962, Ser. No. 233,973
2 Claims. (Cl. 119—103)
(Granted under Title 35, U.S. Code (1952), sec. 266)

The invention described herein may be manufactured and used by or for the Government of the United States of America for governmental purposes without the payment to me of any royalty thereon.

This invention relates to apparatus to hold animals while they are being operated upon or otherwise dealt with, and particularly to such apparatus for small animals such as the rabbit, hamster, rat, guinea pig, etc., which are constantly used in the work of research laboratories, hospitals, and biology departments of educational institutions.

In carrying out laboratory experiments it is frequently necessary to restrain unanesthetized animals for many hours. It should be quite obvious that any prolonged restraint will cause a severe form of stress on the animal. Therefore, it is most important to make the animal as comfortable as possible in order to reduce stress, which in turn could affect the animal adversely and produce undesirable or unreliable experimental results.

A main object of the invention is to provide apparatus to suitably and comfortably support and restrain the animal through means of a spherical device which is placed into a base member in any desired position, thus giving the operator an infinite number of choices. The spherical shape of the device conforms to the curvature of the spine, thus making the animal more comfortable.

Another object of the invention is to provide apparatus for restraining small animals of which the criss-cross structure allows securing the animal's limbs in their natural position without stretching them, and which provides ample air circulation.

Still another object of the invention is to provide a restraining device which has openings in the surface structure to allow the operator to reach his hands in and operate on the ventral surface of the animal's body, such as administering anesthesia and hypodermic injections.

A further object is to provide such apparatus that can be manufactured at a moderate cost and that is durable.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

Figure 1:
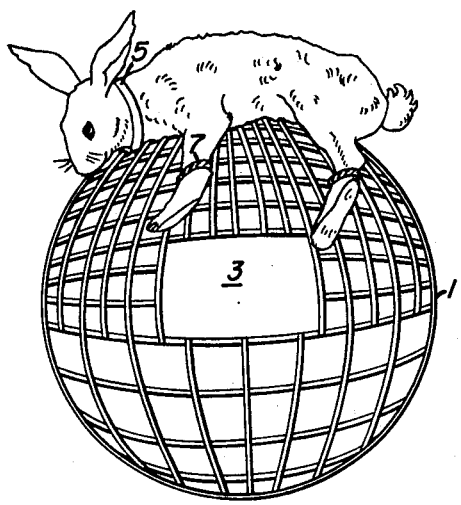
FIG. 1 is a side elevation of a sphere showing an animal secured thereon.

As illustrated, my apparatus has a main spherical member or cage 1 which may be made of stainless steel wire or any other suitable corrosion resistant material. The sphere having side openings 3 (only one is shown) is preferably constructed in such a way that the grating or screening at the upper portion has a finer mesh than that of the lower portion. This is so that there may be more cross-crossings available for the securing of the animal's limbs. The animal is comfortably secured on top of the sphere through means of a neck strap 5 and limb straps 7. Padding (not shown) made of sponge rubber or other suitable material may be placed beneath the animal in a position to further increase the comfort of the animal without interfering with the experimental procedure.

The base member generally shown at 9 comprises a substantially rectangular frame which is constructed approximately to the same configuration as illustrated and made of similar material as the spherical member 1. The supporting ring 10 of the base member which serves as a retainer for the sphere 1 is welded on to the frame 9 and is provided with a plurality of hooks 11. A removable tray 13 containing a removable screen 15 is placed within the base member to receive excreta. The screen serves to separate the urine form the feces.

Figure 2:
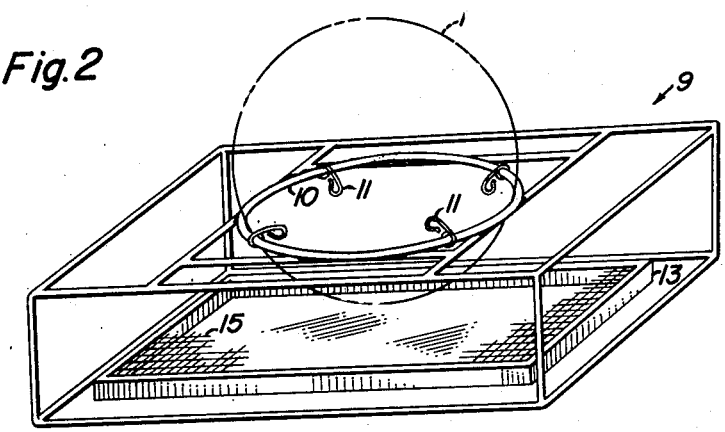
FIG. 2 is a perspective view of the apparatus showing the base with a screened tray therein.

My preferred embodiment is shown in FIG. 2 using the supporting ring 10. However, it is to be understood that the invention is not limited to the use of the ring 10 since the cross bars of the base member 9 serve equally well to retain the cage 1 in position.

In operation my restraining device not only provides a great comfort to the animal since it can be comfortably restrained in the most natural position, but gives the operator an infinite number of choices for positioning or freely rotating the sphere which can be firmly secured within the ring 10, by means of the hooks 11. In addition to this, the device provides (through means of the two side openings) an access to the ventral surface of the animal's body. As illustrated on the drawing, the animal's neck and limbs are comfortably secured to the sphere at the most suitable and natural position at the numerous criss-crossings.

The device can be easily and thoroughly cleaned through spraying or submerging it into a cleaning solution without causing any damage.

I claim:
1. Apparatus for restraining small animals comprising the combination of:
   (a) an open base member having a supporting surface spaced from the bottom of said member;
   (b) a spherical cage adjustably mounted in said base in a manner such that substantially all of said cage protrudes above said supporting surface;
   (c) locking means mounted on said supporting surface to lock said cage into a desirable position;
   (d) restraining means mounted on said cage to restrain the legs and heads of said animals on the external surface of said cage.
2. A device as set forth in claim 1 in which the supporting surface of said base member includes a supporting ring which is of a diameter substantially smaller than the diameter of said cage and is adapted to retain said cage.

References Cited in the file of this patent
UNITED STATES PATENTS

| D. 115,427 | Schepps | June 27, 1939 |
| D. 138,395 | Howard | Aug. 1, 1944 |
| 2,279,012 | Packchanian | Apr. 7, 1942 |
| 2,987,042 | Rothberg | June 6, 1961 |
| 3,011,648 | Einhorn | Dec. 5, 1961 |

FOREIGN PATENTS

| 343,104 | Italy | Sept. 12, 1936 |
| 579,484 | Italy | July 15, 1958 |